United States Patent
Kang et al.

(10) Patent No.: US 12,504,791 B2
(45) Date of Patent: Dec. 23, 2025

(54) DISPLAY DEVICE

(71) Applicant: LG ELECTRONICS INC., Seoul (KR)

(72) Inventors: Seunggyu Kang, Seoul (KR); Hyuncheol Cho, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 135 days.

(21) Appl. No.: 18/450,214

(22) Filed: Aug. 15, 2023

(65) Prior Publication Data

US 2024/0295906 A1    Sep. 5, 2024

(30) Foreign Application Priority Data

Mar. 2, 2023  (KR) .......................... 10-2023-0027723

(51) Int. Cl.
*G06F 1/16*    (2006.01)

(52) U.S. Cl.
CPC .................................. *G06F 1/1658* (2013.01)

(58) Field of Classification Search
USPC .......................................................... 349/56
See application file for complete search history.

(56) References Cited

U.S. PATENT DOCUMENTS

| | | | | |
|---|---|---|---|---|
| 11,460,630 | B2* | 10/2022 | Yamamoto | G02B 6/0088 |
| 11,464,142 | B2* | 10/2022 | Kazama | H04N 5/64 |
| 2021/0116958 | A1* | 4/2021 | Ryu | H10K 59/131 |
| 2022/0342255 | A1* | 10/2022 | Kang | G06F 1/1601 |

FOREIGN PATENT DOCUMENTS

| | | |
|---|---|---|
| KR | 10-2012-0081792 | 7/2012 |
| KR | 10-2017-0062937 | 6/2017 |
| KR | 10-2020-0069091 | 6/2020 |

OTHER PUBLICATIONS

Korean Intellectual Property Office Application No. 10-2023-0027723, Office Action dated Dec. 18, 2024, 8 pages.

* cited by examiner

*Primary Examiner* — Allen L Parker
*Assistant Examiner* — Elisa Sasserath
(74) *Attorney, Agent, or Firm* — LEE, HONG, DEGERMAN, KANG & WAIMEY

(57) ABSTRACT

A display device is provided. The display device of the present disclosure includes: a display panel; a plate which is disposed at a rear of the display panel and to which the display panel is coupled; a base disposed at a rear of the plate; and a fastening member coupling the plate to the base, wherein the fastening member includes: a head contacting a front surface of the plate; and a body protruding from the head and passing through the plate to be fastened to the base.

15 Claims, 17 Drawing Sheets

DISPLAY DEVICE

CROSS-REFERENCE TO RELATED APPLICATION

Pursuant to 35 U.S.C. § 119, this application claims the benefit of earlier filing date and right of priority to Korean Patent Application No. 10-2023-0027723, filed on Mar. 2, 2023, the contents of which are all incorporated by reference herein in its entirety.

BACKGROUND OF THE INVENTION

Field of the Invention

The present disclosure relates to a display device.

Description of the Related Art

With the development of the information society, there have been growing demands for various types of display devices, and in order to meet these demands, various display devices, such as a liquid crystal display (LCD), a plasma display panel (PDP), an electroluminescent display (ELD), a vacuum fluorescent display (VFD), an organic light emitting diode (OLED), etc., have been studied and used recently.

Among them, the LCD panel includes a TFT substrate and a color substrate which are positioned opposite each other with a liquid crystal layer interposed therebetween, and displays images by using light emitted by a backlight unit. Further, the OLED panel may display images by using a self light-emitting organic layer deposited on a substrate on which transparent electrodes are formed.

Particularly, in comparison with a display device using the LCD panel, a display device using the OLED panel has excellent luminance and viewing angle characteristics and does not require a backlight unit, such that the OLED display device can be implemented as an ultra-thin display device.

Recently, a large-screen, ultra-thin display device is being actively researched.

SUMMARY OF THE INVENTION

It is an objective of the present disclosure to solve the above and other problems.

Another objective of the present disclosure may be to provide a structure for coupling a side frame and/or a frame to a plate.

Another objective of the present disclosure may be to provide a structure for coupling a plate, a side frame, and a frame by a fastening member such as a screw.

Another objective of the present disclosure may be to provide a structure for minimizing damage to a display panel or a local hot-spot occurring therein, which is caused by a coupling structure using a fastening member.

In accordance with an aspect of the present disclosure, the above and other objectives can be accomplished by providing a display device including: a display panel; a plate which is disposed at a rear of the display panel and to which the display panel is coupled; a base disposed at a rear of the plate; and a fastening member coupling the plate to the base, wherein the fastening member includes: a head contacting a front surface of the plate; and a body protruding from the head and passing through the plate to be fastened to the base.

BRIEF DESCRIPTION OF THE DRAWINGS

The above and other objects, features and advantages of the present disclosure will be more apparent from the following detailed description in conjunction with the accompanying drawings, in which.

DETAILED DESCRIPTION

Figure 1:
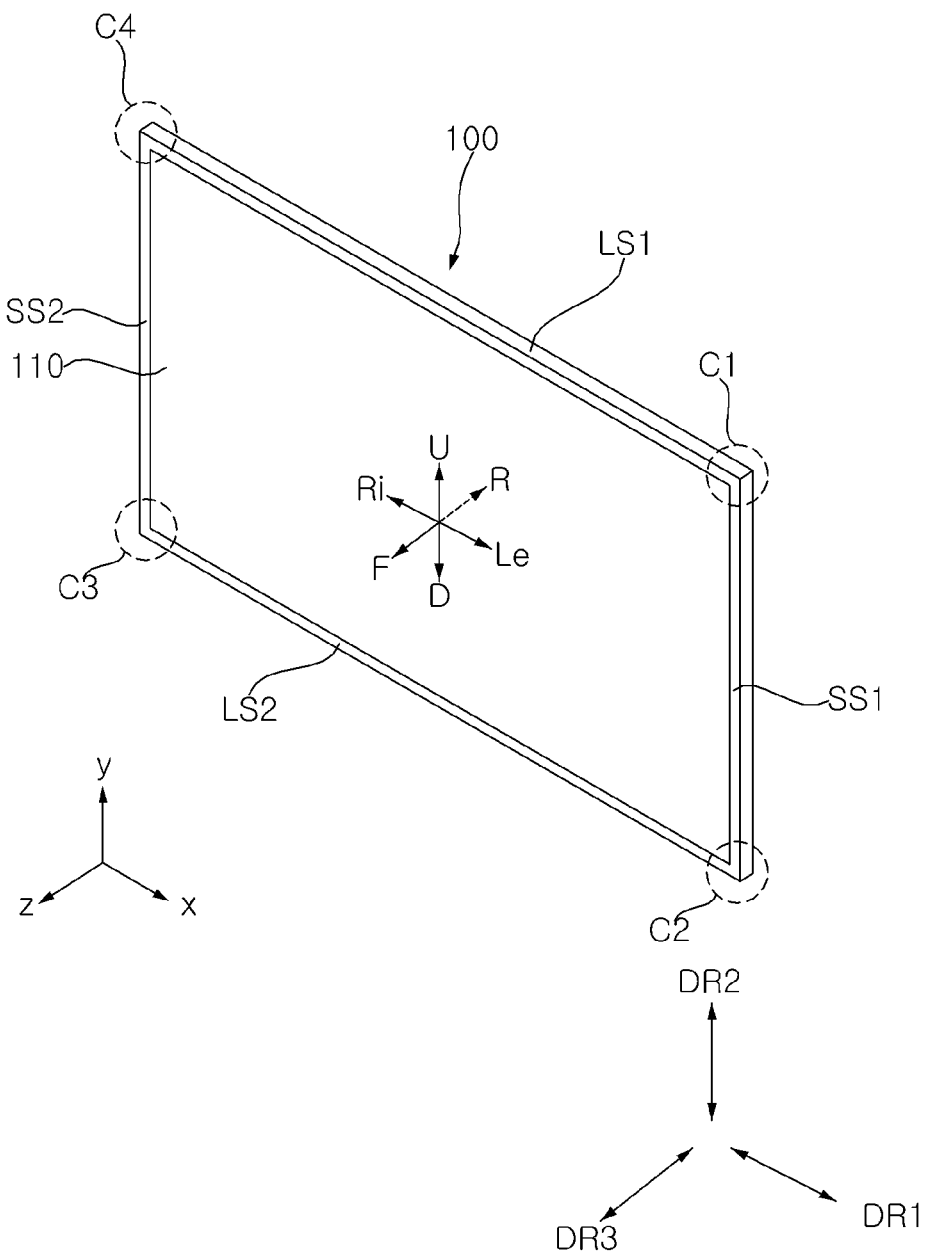
FIGS. 1 to 17 are diagrams illustrating examples of a display device according to embodiments of the present disclosure.

Hereinafter, the present disclosure will be described in detail with reference to the accompanying drawings, in which the same reference numerals are used throughout the drawings to designate the same or similar components, and a redundant description thereof will be omitted.

The suffixes, such as "module" and "unit," for elements used in the following description are given simply in view of the ease of the description, and do not have a distinguishing meaning or role.

In addition, it will be noted that a detailed description of known arts will be omitted if it is determined that the detailed description of the known arts can obscure the embodiments of the present disclosure. Further, the accompanying drawings are used to help easily understand various technical features and it should be understood that the embodiments presented herein are not limited by the accompanying drawings. As such, the present disclosure should be construed to extend to any alterations, equivalents and substitutes in addition to those which are particularly set out in the accompanying drawings.

It will be understood that although the terms first, second, etc. may be used herein to describe various elements, these elements should not be limited by these terms. These terms are only used to distinguish one element from another.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

A singular representation may include a plural representation unless context clearly indicates otherwise.

It should be understood that the terms "comprise", "include", "have", etc. when used in this specification, specify the presence of stated features, integers, steps, operations, elements, components, or combinations thereof but do not preclude the presence or addition of one or more other features, integers, steps, operations, elements, components, or combinations thereof.

Directions, such as up (U), down (D), left (L), right (R), front (F), and rear (R), shown in the drawings are merely for convenience of explanation, and the scope of the present disclosure is not limited thereto.

Referring to FIG. 1, a display device 100 may include a display panel 110. The display panel 110 may display images.

The display device 100 may include a first long side LS1, a second long side LS2 opposite to the first long side LS1, a first short side SS1 adjacent to the first long side LS1 and the second long side LS2, and a second short side SS2 opposite to the first short side SS1. For convenience of explanation, it is illustrated and described that the first and second long sides LS1 and LS2 are longer than the first and second short sides SS1 and SS2, but it is also possible that lengths of the first and second long sides LS1 and LS2 may be approximately equal to lengths of the first and second short sides SS1 and SS2.

A direction parallel to the long sides LS1 and LS2 of the display device 100 may be referred to as a first direction DR1 or a left-right direction. The first short side SS1 may be referred to as a left side Le, x, and the second short side SS2 may be referred to as a right side Ri.

A direction parallel to the short sides SS1 and SS2 of the display device 100 may be referred to as a second direction DR2 or an up-down direction. The first long side LS1 may be referred to as an upper side U, y, and the second long side LS2 may be referred to as a lower side D.

A direction perpendicular to the long sides LS1 and LS2 and the short sides SS1 and SS2 of the display device 100 may be referred to as a third direction DR3 or a front-rear direction. A side on which the display panel 110 displays an image may be referred to as a front side F, z, and a side opposite thereto may be referred to as a rear side R.

The long sides LS1 and LS2 and the short sides SS1 and SS2 may be referred to as edges of the display device 100. Further, positions where the long sides LS1 and LS2 and the short sides SS1 and SS2 meet each other may be referred to as corners. A position where the first long side LS1 and the first short side SS1 meet each other may be referred to as a first corner C1. A position where the first short side SS1 and the second long side LS2 meet each other may be referred to as a second corner C2. A position where the second long side LS2 and the second short side SS2 meet each other may be referred to as a third corner C3. A position where the second short side SS2 and the first long side LS1 meet each other may be referred to as a fourth corner C4.

Hereinafter, the display panel 110 will be described using an Organic Light Emitting Diode (OLED) display panel as an example, but the type of the display panel 110 which may be applied to the present disclosure is not limited thereto, and an LED or micro-LED display panel and the like may be applied to the present disclosure.

Figure 2:
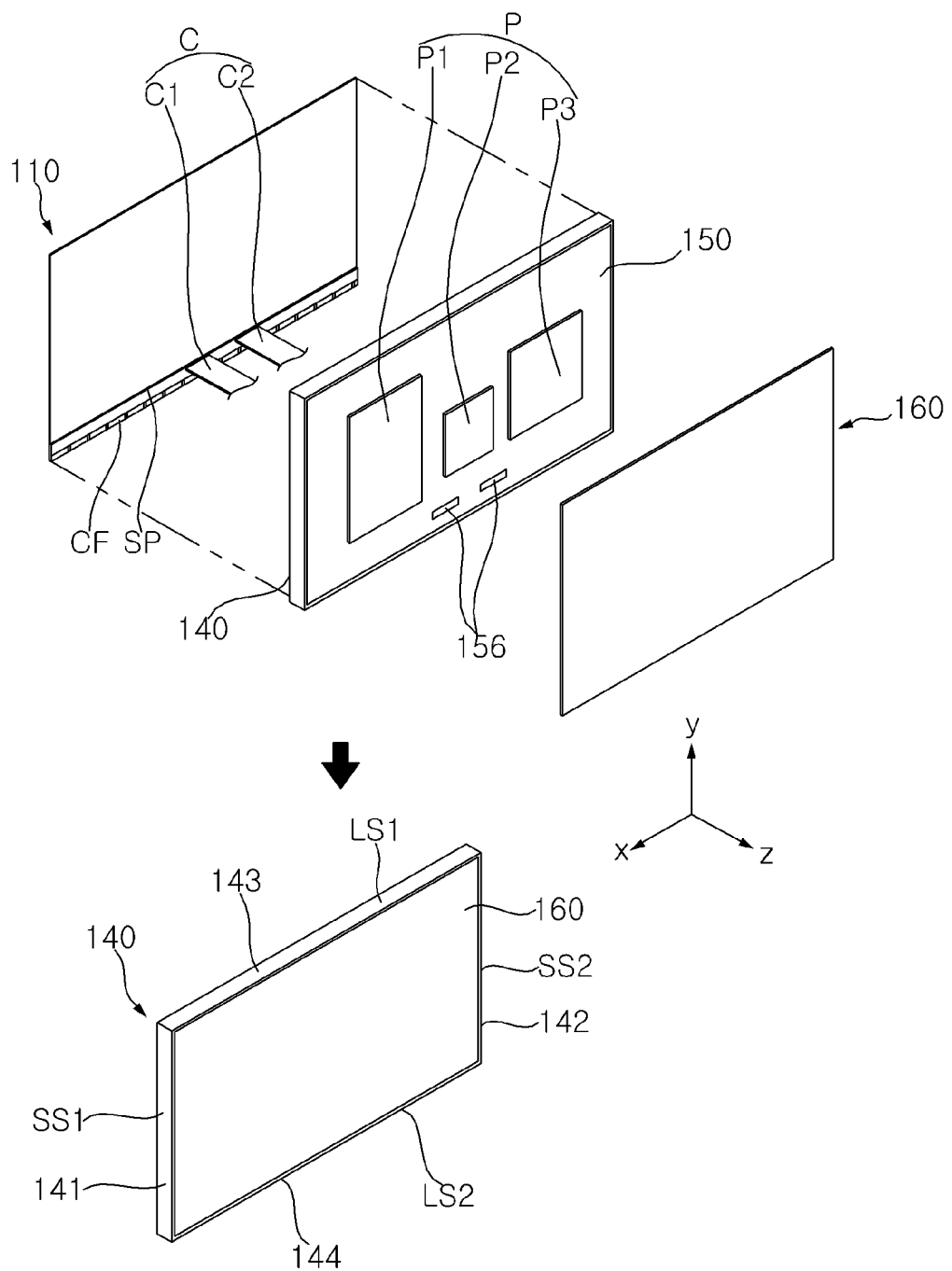

Referring to FIGS. 1 and 2, the display panel 110 may divide an image into a plurality of pixels and may output the image while controlling color, brightness, and chroma of the respective pixels. The display panel 110 may be divided into an active area, in which the image is displayed, and a de-active area in which the image is not displayed. The display panel 110 may generate light corresponding to red, green, or blue color in response to a control signal.

A frame 150 may be disposed at the rear of the display panel 110, and the display panel 110 may be coupled to the frame 150. The frame 150 may be referred to as a mount plate 150, a PCB plate 150, a module cover 150, or a cover bottom 150.

A plurality of boards P may be mounted on a rear surface of the frame 150 and may be electrically connected to electronic components of the display device. The boards P may be Printed Circuit Boards (PCB), and the electronic components may be mounted on the boards P. A power supply board P1 may supply power to the respective components of the display device. A timing controller board P2 may provide an image signal to the display panel 110. A main board P3 may control the respective components of the display device. For example, the power supply board may be adjacent to a left side of the frame 150, the main board P3 may be adjacent to a right side of the frame 150, and the timing controller board P2 may be disposed between the power supply board P1 and the main board P3.

A source PCB SP may be adjacent to a lower side of the display panel 110 and may extend along the lower side thereof. Cables CF may connect the lower side of the display panel 110 and the source PCB SP. For example, the cables CF may be a chip-on-film (COF). At least one cable C connected to the source PCB SP may pass through cable holes 156 formed in the frame 150 and may be electrically connected to the timing controller board P2. For example, the cable C may be a flexible flat cable (FFC).

A side frame 140 may extend along the edges of the display panel 110 and may cover the edges of the display panel 110. The side frame 140 may be coupled to the frame 150. The side frame 140 may be referred to as a guide panel 140 or a middle cabinet 140.

A back cover 160 may be disposed at the rear of the frame 150 and may be coupled to the frame 150. The plurality of boards P may be disposed between the frame 150 and the back cover 160 and may be covered by the back cover 160.

Figure 3:
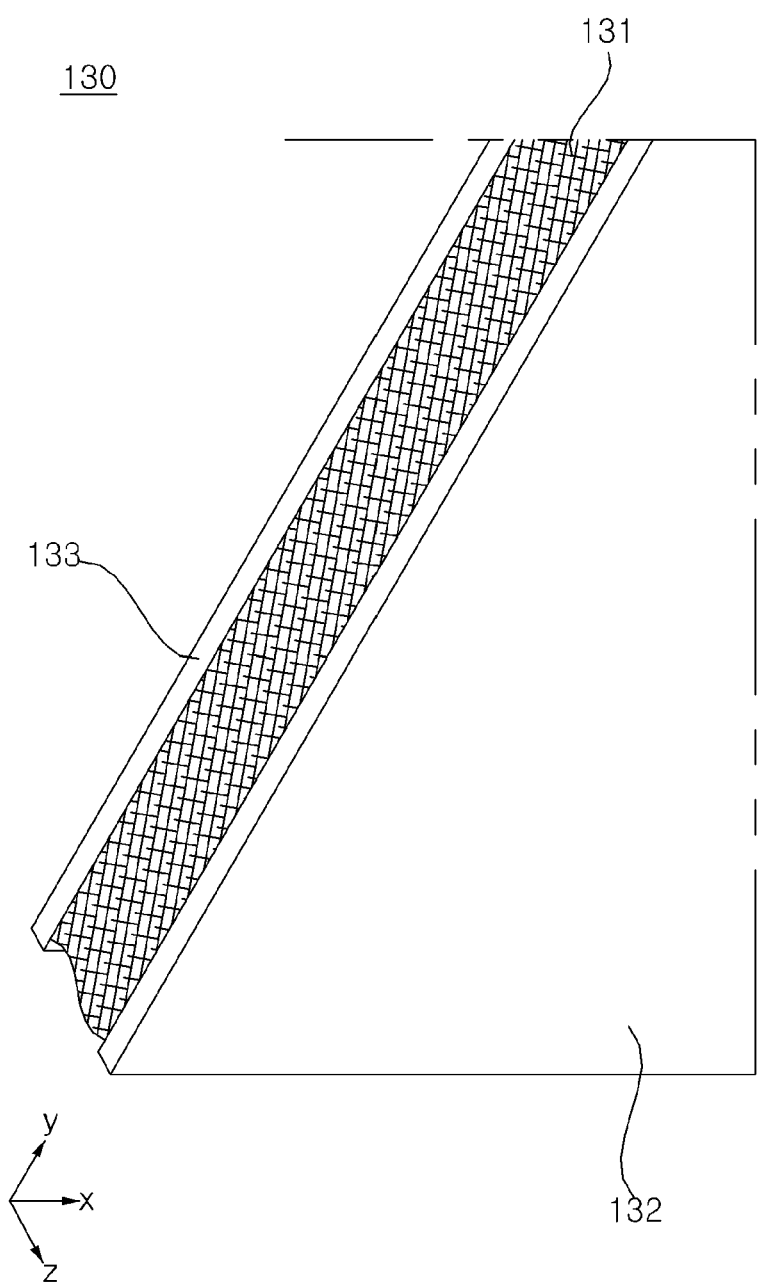
Figure 4:
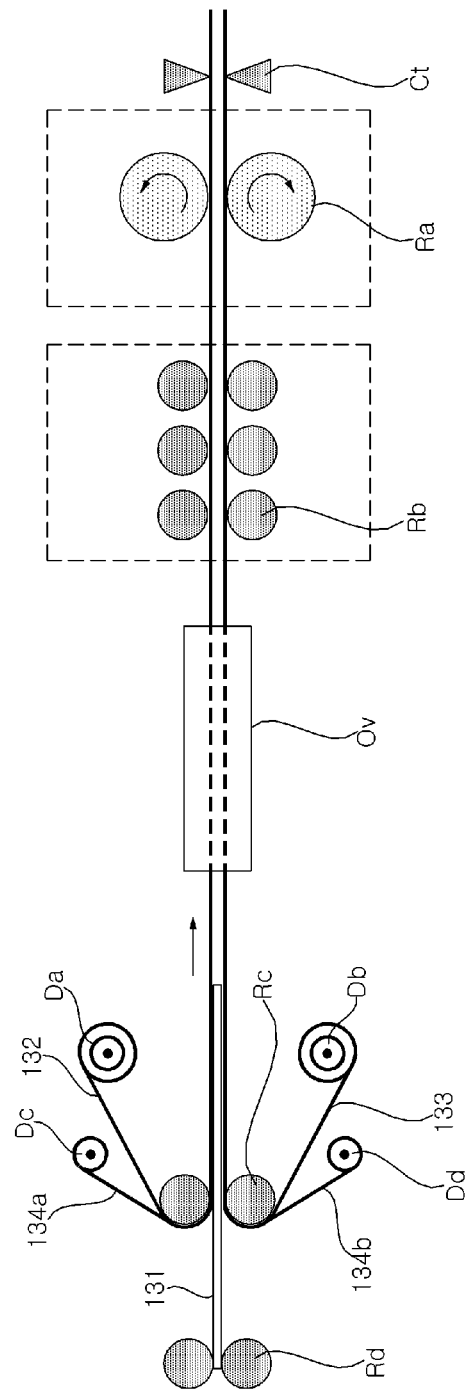
Figure 5:
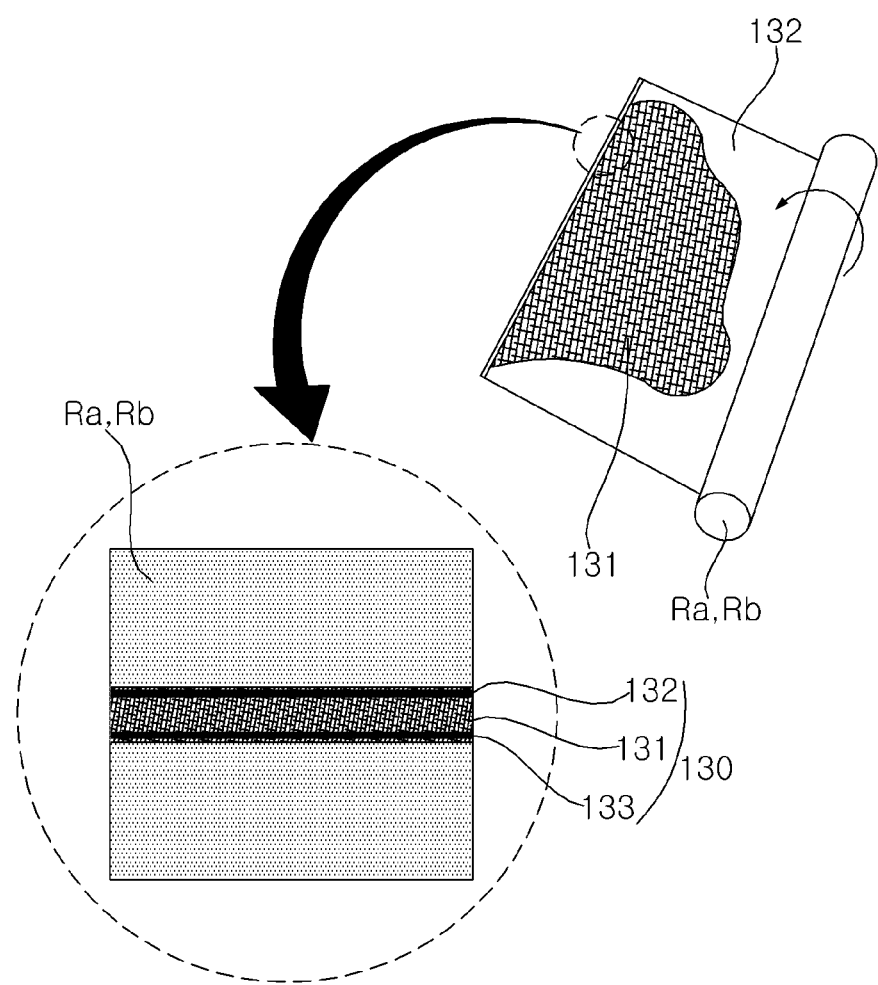

Referring to FIGS. 3 to 5, a plate 130 may include a core 131, a front skin 132, and a rear skin 133. The plate 130 may be referred to as an inner plate 130, a material complexed panel 130, a fiber complexed panel 130, a fiber complexed plate 130, or a material complexed plate 130.

The front skin 132 may define a front surface of the plate 130. The rear skin 133 may define a rear surface of the plate 130. The front skin 132 and the rear skin 133 may include a metal material. For example, the front skin 132 and the rear skin 133 may be galvanized iron. In another example, the front skin 132 and the rear skin 133 may include aluminum (Al).

The core 131 may be disposed between the front skin 132 and the rear skin 133. The core 131 may include fibers. The core 131 may be made of a composite material. The core 131 may include a main fiber and a binder fiber. The binder fiber may be mixed into the main fiber.

The plate 130 may be manufactured by pressing the front skin 132 and the rear skin 133 to the core 131 using a plurality of rollers, and this process may be referred to as a roll-to-roll process.

By rotation of a pinch roller Ra acting as a driving motor, the front skin 132 is unwound from a front drum Da, the rear skin 133 is unwound from a rear drum Db, and the core 131 moves through a feeding roller Rd. Then, a first adhesive 134a for bonding the front skin 132 to the core 131 may be unwound from the first drum Dc. In addition, a second adhesive 134b for bonding the rear skin 133 to the core 131 may be unwound from the second drum Db. In this case, the front skin 132, the first adhesive 134a, the core 131, the second adhesive 134b, and the rear skin 133 are laminated in this order and may be guided by a guide roller Rc toward an oven Ov. The adhesives 134a and 134b may be hot-melt sheets 134a and 134b.

The first and second adhesives 134a and 134b are melted in the oven Ov to allow each of the front skin 132 and the rear skin 133 to be bonded to the core 131. After passing through the oven Ov, the front skin 132, the core 131, and the rear skin 133 may be guided to a pressure roller Rb by the rotation of the pinch roller Ra and may be pressed by the pressure roller Rb, thereby further strengthening the bonding force between the front skin 132, the core 131, and the rear skin 133. After passing through the pinch roller Ra, the front skin 132, the core 131, and the rear skin 133 which are bonded together may be cut by a cutter Ct, such that the plate 130 may be manufactured in a predetermined size.

In addition to the roll-to-roll process, a process of sequentially laminating and bonding the front skin 132, the core 131, and the rear skin 133 may also be used to bond the front skin 132 and the rear skin 133 to the core 131.

Accordingly, bending stiffness and/or torsional stiffness of the display device may be improved.

Figure 6:
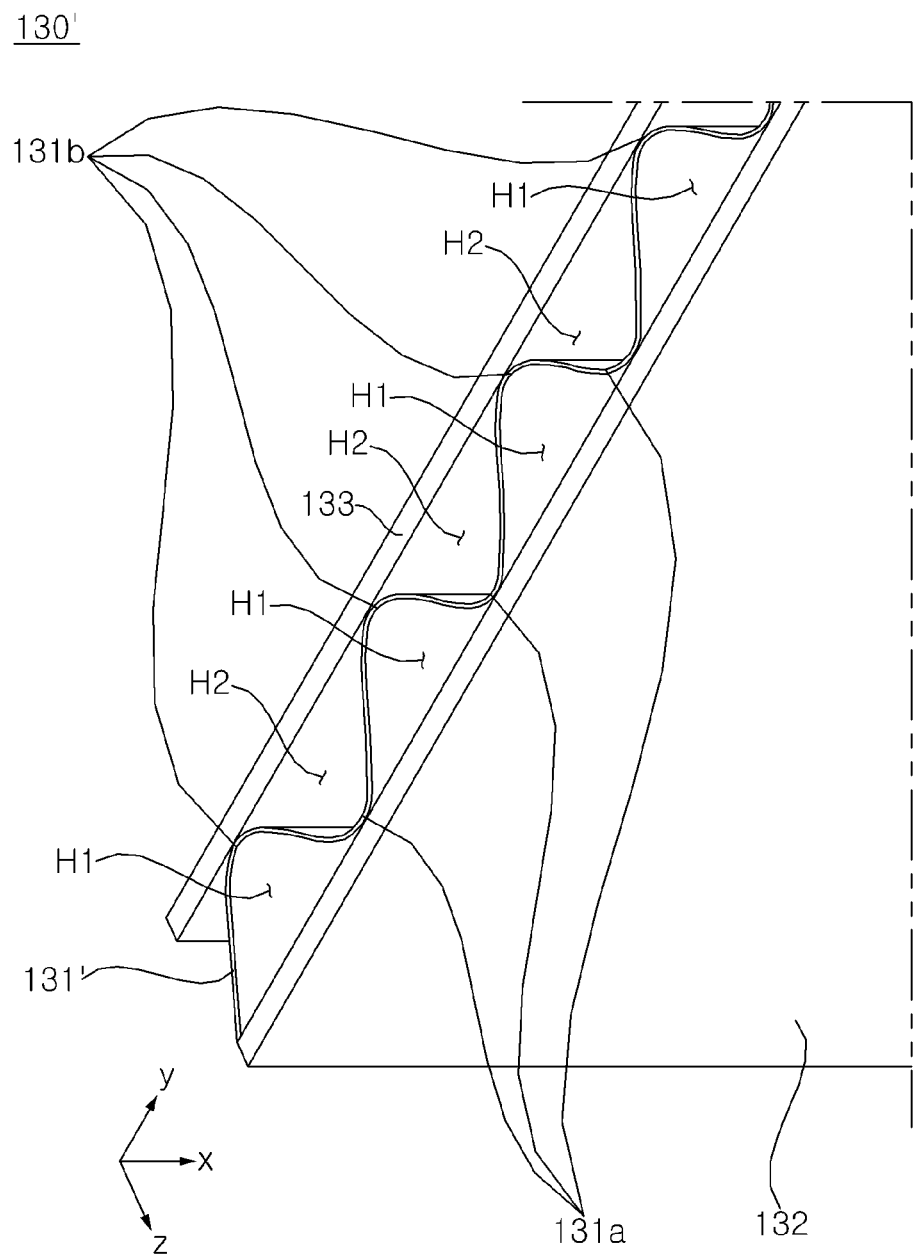
Figure 7:
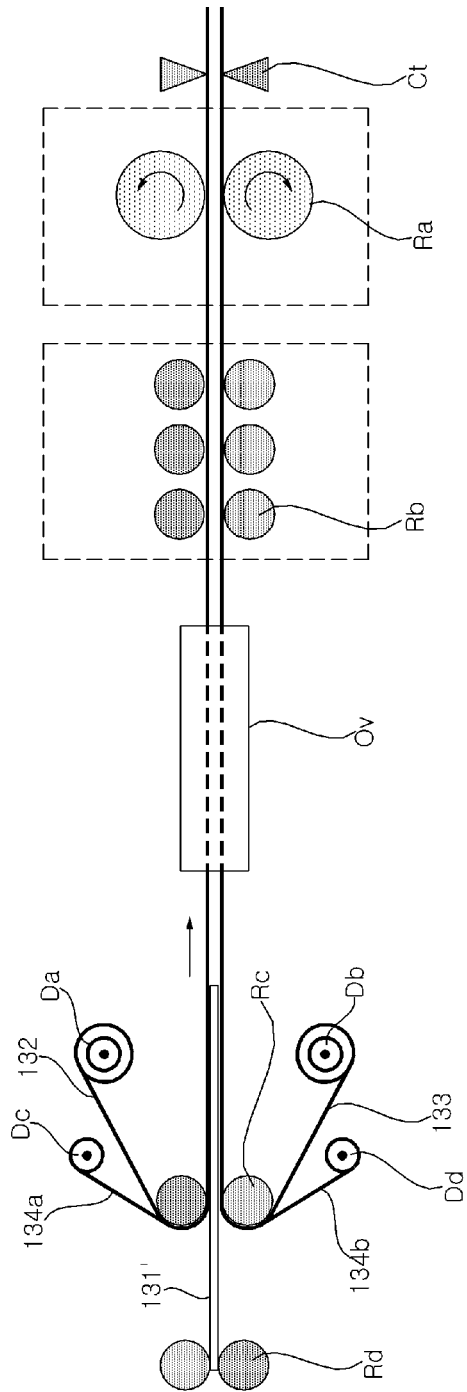
Figure 8:
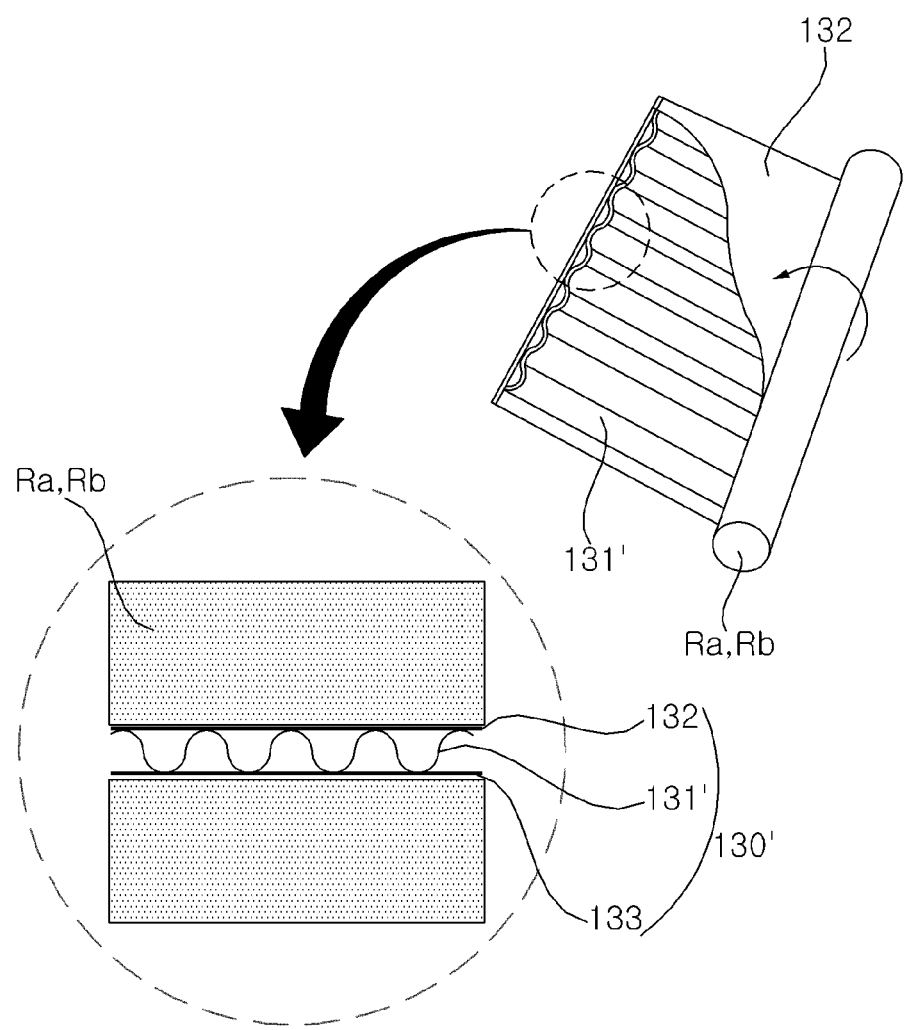

Referring to FIGS. 6 to 8, a plate 130' may include a core 131', the front skin 132, and the rear skin 133. The plate 130' may be referred to as an inner plate 130', a corrugated panel 130' or a corrugated plate 130'.

The front skin 132 may define a front surface of the plate 130'. The rear skin 133 may define a rear surface of the plate 130'. The front skin 132 and the rear skin 133 may include a metal material. For example, the front skin 132 and the rear skin 133 may be galvanized iron. In another example, the front skin 132 and the rear skin 133 may include aluminum (Al).

The core 131' may be disposed between the front skin 132 and the rear skin 133. The core 131' may have a wavy corrugated shape. The core 131' may have a corrugated shape having alternating ridges 131 and grooves 131b that are elongated. The ridges 131a may be in contact with an inner surface of the front skin 132, and the grooves 131b may be in contact with an inner surface of the rear skin 133.

The plate 130' may be manufactured by pressing the front skin 132 and the rear skin 133 to the core 131' using a plurality of rollers, and this process may be referred to as a roll-to-roll process.

By rotation of the pinch roller Ra acting as a driving motor, the front skin 132 is unwound from the front drum Da, the rear skin 133 is unwound from the rear drum Db, and the core 131' moves through the feeding roller Rd. Then, the first adhesive 134a for bonding the front skin 132 to the core 131' may be unwound from the first drum Dc. In addition, the second adhesive 134b for bonding the rear skin 133 to the core 131' may be unwound from the second drum Db. In this case, the front skin 132, the first adhesive 134a, the core 131', the second adhesive 134b, and the rear skin 133 are laminated in this order and may be guided by the guide roller Rc toward the oven Ov. The adhesives 134a and 134b may be hot-melt sheets 134a and 134b.

The first and second adhesives 134a and 134b are melted in the oven Ov to allow each of the front skin 132 and the rear skin 133 to be bonded to the core 131'. After passing through the oven Ov, the front skin 132, the core 131', and the rear skin 133 may be guided to the pressure roller Rb by the rotation of the pinch roller Ra and may be pressed by the pressure roller Rb, thereby further strengthening the bonding force between the front skin 132, the core 131', and the rear skin 133. After passing through the pinch roller Ra, the front skin 132, the core 131', and the rear skin 133 which are bonded together may be cut by a cutter Ct, such that the plate 130' may be manufactured in a predetermined size.

In addition to the roll-to-roll process, a process of sequentially laminating and bonding the front skin 132, the core 131', and the rear skin 133 may also be used to bond the front skin 132 and the rear skin 133 to the core 131'.

Accordingly, the plate 130' may improve bending stiffness and/or torsional stiffness of the display device.

Figure 9:
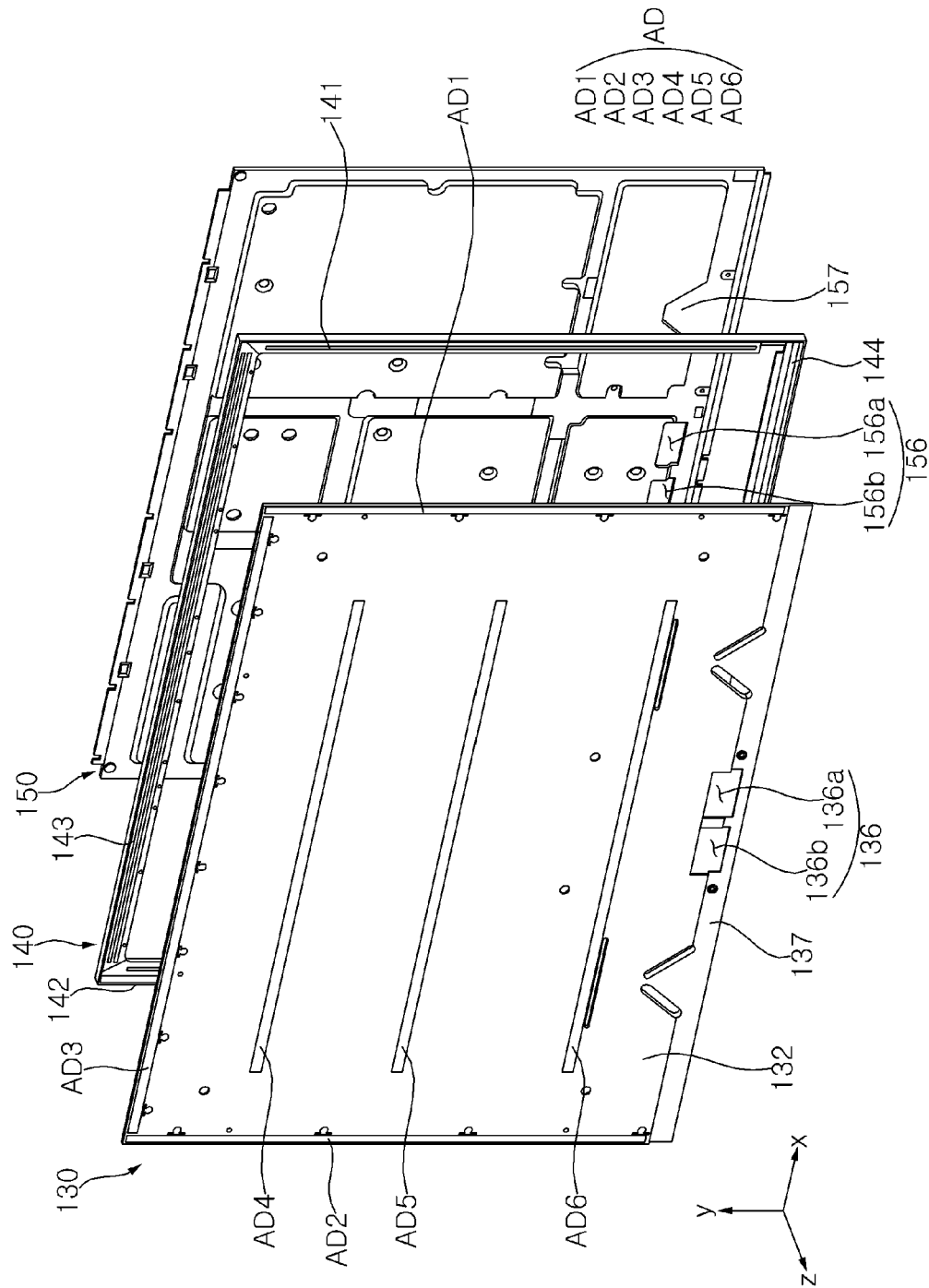

Referring to FIG. 9, the plate 130 may be disposed at the front of the frame 150. Instead of the plate 130, the plate 130' (see FIG. 6) may be disposed at the front of the frame 150. Alternatively, instead of the plates 130 and 130', a plate with a single layer or multiple layers may be disposed at the front of the frame 150. For convenience of explanation, the following description will be given based on the plate 130, but the type of plate which may be applied to the present disclosure is not limited thereto.

A receiving part 137 may be adjacent to a lower side of the plate 130 and may be pressed rearwardly from a front surface of the front skin 132. The source PCB SP (see FIG. 2) may be disposed on a front surface of the receiving part 137.

A cable hole 136 may be adjacent to the lower side of the plate 130 and may be formed through the plate 130. Some of the cable hole 136 may be formed through the receiving part 137. In the front-rear direction, the cable hole 136 may be aligned with a cable hole 156 of the frame 150. A first cable C1 may pass through first cable holes 136a and 156a, and a second cable C2 may pass through second cable holes 136b and 156b (see FIG. 2).

An adhesive member AD may be attached to the front surface of the front skin 132. For example, the adhesive member AD may be double-sided tape. For example, a plurality of adhesive members AD may have the same thickness. A first adhesive member AD1 may be adjacent to a left side of the plate 130 and may extend along the left side thereof. A second adhesive member AD2 may be adjacent to a right side of the plate 130 and may extend along the right side thereof. A third adhesive member AD3 may be adjacent to an upper side of the plate 130 and may extend along the upper side thereof. A fourth adhesive member AD4 may be disposed below the third adhesive member AD3 and may extend along the third adhesive member AD3. A fifth adhesive member AD5 may be disposed below the fourth adhesive member AD4 and may extend along the fourth adhesive member AD4. A sixth adhesive member AD6 may be disposed below the fifth adhesive member AD5 and may extend along the fifth adhesive member AD5. The first and second adhesive members AD1 and AD2 may be referred to as vertical adhesive members AD1 and AD2. The third to sixth adhesive members AD3, AD4, AD5, and AD6 may be referred to as horizontal adhesive members AD3, AD4, AD5, and AD6.

A rear surface of the display panel 110 may be attached to the adhesive member AD, such that the display panel 110 may be bonded to the front skin 132. A gap between the rear surface of the display panel 110 and the front surface of the front skin 132 may be equal to a thickness of the adhesive member AD. The plate 130 may be referred to as a heatsink 130.

Figure 10:
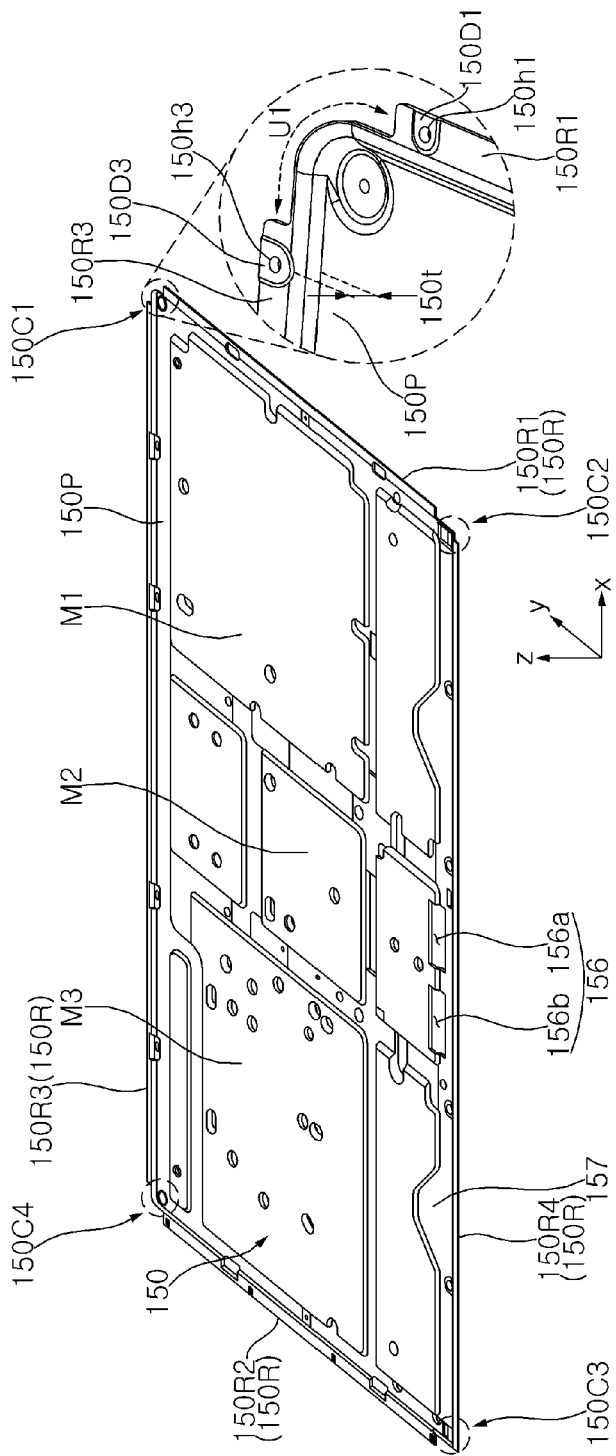

Referring to FIG. 10, the frame 150 may have a substantially rectangular plate shape. A plurality of mounting parts M1, M2, and M3 may be pressed forwardly from a rear surface of a flat plate part 150P. The power supply board P1 (see FIG. 2) may be mounted on a rear surface of a first mounting part M1. The timing controller board P2 (see FIG. 2) may be mounted on a rear surface of a second mounting part M2. The main board P3 (see FIG. 2) may be mounted on a rear surface of a third mounting part M3.

A seating part 150R may extend along edges of the flat plate part 150P and may define the edges of the frame 150. For example, the seating part 150R may be pressed forwardly from the edges of the flat plate part 150P, and a stepped portion 150t may be formed between the flat plate part 150P and the seating part 150R. In another example, the seating part 150R may be formed parallel to the flat plate part 150P. The seating part 150R may include a first seating part 150R1, a second seating part 150R2, a third seating part 150R3, and a fourth seating part 150R4.

The first seating part 150R1 may extend along a left side of the flat plate part 150P and may define a left side of the frame 150. A first hole 150h1 may be formed through front and rear sides of the first seating part 150R1. A first pressed portion 150D1 may be pressed forwardly from a rear surface of the first seating part 150R1, and the first hole 150h1 may be formed in the first pressed portion 150D1. A plurality of first holes 150*h*1 may be spaced apart from each other along the first seating part 150R1.

The second seating part 150R2 may extend along a right side of the flat plate part 150P and may define a right side of the frame 150. A second hole may be formed through front and rear sides of the second seating part 150R2. A second pressed portion may be pressed forwardly from a rear surface of the second seating part 150R2, and the second hole may be formed in the second pressed portion. A plurality of second holes may be spaced apart from each other along the second seating part 150R2. For example, the second seating part 150R2 may be horizontally symmetrical to the first seating part 150R1.

The third seating part 150R3 may extend along an upper side of the flat plate part 150P and may define an upper side of the frame 150. A third hole 150*h*3 may be formed through front and rear sides of the third seating part 150R3. A third pressed portion 150D3 may be pressed forwardly from a rear surface of the third seating part 150R3, and the third hole 150*h*3 may be formed in the third pressed portion 150D3. A plurality of third holes 150*h*3 may be spaced apart from each other along the third seating part 150R3.

The fourth seating part 150R4 may extend along a lower side of the flat plate part 150P and may define a lower side of the frame 150. A fourth hole may be formed through front and rear sides of the fourth seating part 150R4. A fourth pressed portion may be pressed forwardly from a rear surface of the fourth seating part 150R4, and the fourth hole may be formed in the fourth pressed portion. A plurality of fourth holes may be spaced apart from each other along the fourth seating part 150R4. For example, the fourth seating part 150R4 may be vertically symmetrical to the third seating part 150R3.

A first cut-out 150C1 may be formed by cutting out a portion of the seating part 150R at a position between the first seating part 150R1 and the third seating part 150R3. The first cut-out 150C1 may be formed along a first corner u1 of the stepped portion 150*t* at a position between an upper end of the first seating part 150R1 and a left end of the third seating part 150R3.

A second cut-out 150C2 may be formed by cutting out a portion of the seating part 150R at a position between the first seating part 150R1 and the fourth seating part 150R4. The second cut-out 150C2 may be formed along a second corner of the stepped portion 150*t* at a position between a lower end of the first seating part 150R1 and a left end of the fourth seating part 150R4. For example, the second cut-out 150C2 may be vertically symmetrical to the first cut-out 150C1.

A third cut-out 150C3 may be formed by cutting out a portion of the seating part 150R at a position between the second seating part 150R2 and the fourth seating part 150R4. The third cut-out 150C3 may be formed along a third corner of the stepped portion 150*t* at a position between a lower end of the second seating part 150R2 and a right end of the fourth seating part 150R4. For example, the third cut-out 150C3 may be horizontally symmetrical to the second cut-out 150C2.

A fourth cut-out 150C4 may be formed by cutting out a portion of the seating part 150R at a position between the second seating part 150R2 and the third seating part 150R3. The fourth cut-out 150C4 may be formed along a fourth corner of the stepped portion 150*t* at a position between an upper end of the second seating part 150R2 and a left end of the third seating part 150R3. For example, the fourth cut-out 150C4 may be vertically symmetrical to the third cut-out 150C3.

Figure 11:
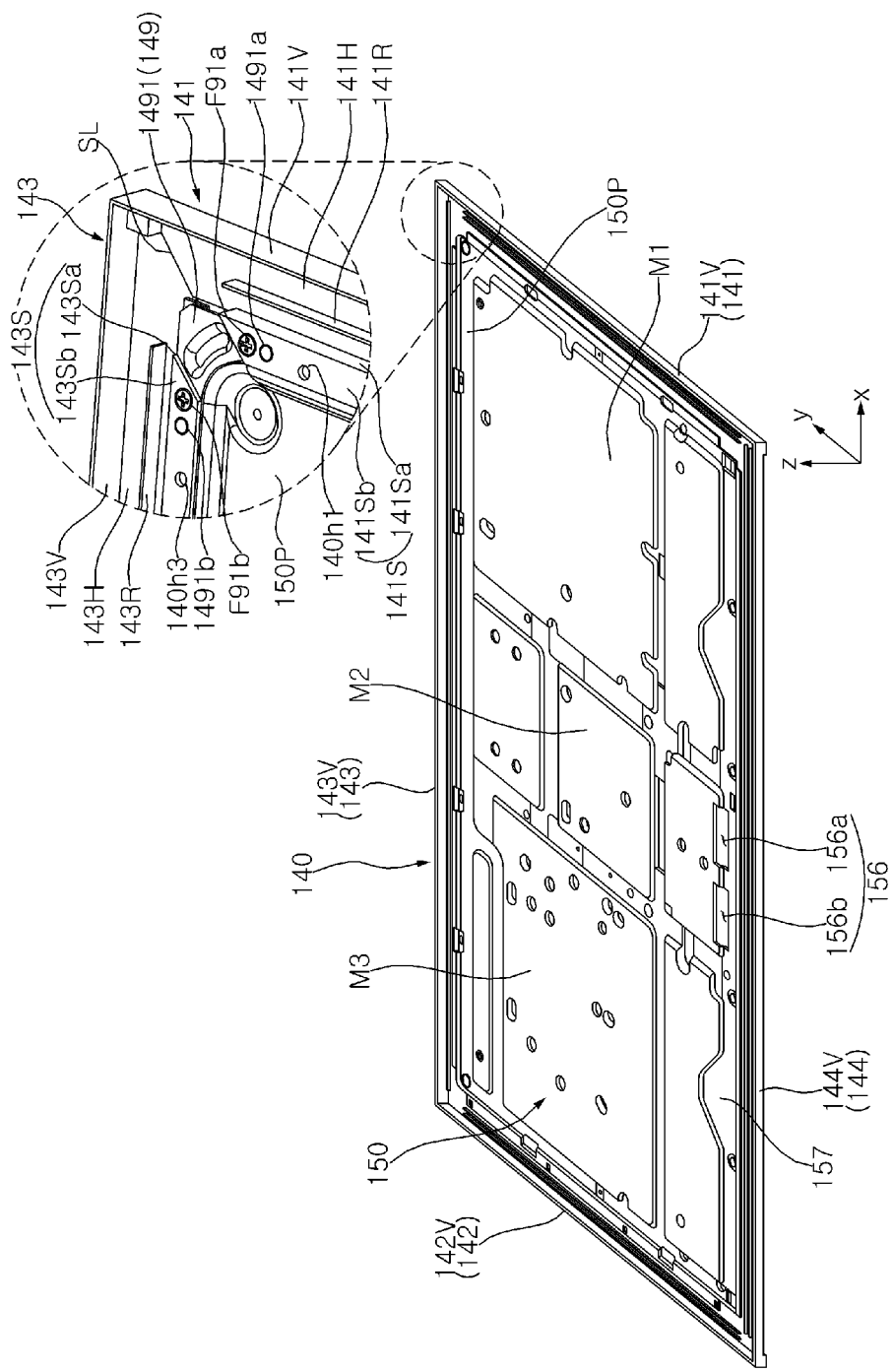

Referring to FIGS. 10 and 11, the side frame 140 may include a first part 141, a second part 142, a third part 143, and a fourth part 144. The first part 141 may extend along the left side of the plate 130. The second part 142 may extend along the right side of the plate 130. The third part 143 may extend along the upper side of the plate 130. The fourth part 144 may extend along the lower side of the plate 130.

For example, the first part 141 may be bent downward at a left end of the third part 143, and the fourth part 144 may be bent rightward at a lower end of the first part 141. For example, the second part 142 may be bent upward at a right end of the fourth part 144, and the third part 143 may be bent leftward at an upper end of the second part 142. In this case, slits SL may be formed between the first part 141 and the third part 143, between the fourth part 144 and the first part 141, between the second part 142 and the fourth part 144, and between the third part 143 and the second part 142.

The first part 141 may include a first vertical part 141V and a first horizontal part 141H. The first vertical part 141V may extend along the left side of the plate 130 (see FIG. 12) and may cover the left side thereof. The first horizontal part 141H may intersect the first vertical part 141V and may extend along the first seating part 150R1. A first rib 141R may protrude from a front surface of the first horizontal part 141H and may extend along the first seating part 150R1. A first protrusion 141Sa of a first fixing part 141S may protrude from the front surface of the first horizontal part 141H, may be disposed between the first rib 141R and the first seating part 150R1, and may extend along the first seating part 150R1. A first overlapping portion 141Sb of the first fixing part 141S may be bent rightward at a front end of the first protrusion 141Sa and may be seated on the front surface of the first seating part 150R1. With respect to the first horizontal part 141H, a height of the first overlapping portion 141Sb may be substantially equal to a height of the first rib 141R. A first through hole 140*h*1 may be formed through front and rear sides of the first overlapping portion 141Sb and may be aligned with the first hole 150*h*1. Each of a plurality of first through holes 140*h*1 may be aligned with each of the plurality of first holes 150*h*1.

The second part 142 may include a second vertical part 142V and a second horizontal part. The second vertical part 142V may extend along the right side of the plate 130 (see FIG. 12) and may cover the right side thereof. The second horizontal part may intersect the second vertical part 142V and may extend along the second seating part 150R2. A second rib may protrude from a front surface of the second horizontal part and may extend along the second seating part 150R2. A second protrusion of a second fixing part may protrude from the front surface of the second horizontal part, may be disposed between the second rib and the second seating part 150R2, and may extend along the second seating part 150R2. A second overlapping portion of the second fixing part may be bent leftward at a front end of the second protrusion and may be seated on the front surface of the second seating part 150R2. With respect to the second horizontal part, a height of the second overlapping portion may be substantially equal to a height of the second rib. A second through hole may be formed through front and rear sides of the second overlapping portion and may be aligned with the second hole. Each of a plurality of second through holes may be aligned with each of the plurality of second holes. For example, the second part 142 may be horizontally symmetrical to the first part 141.

The third part 143 may include a third vertical part 143V and a third horizontal part 143H. The third vertical part 143V may extend along the upper side of the plate 130 (see FIG. 12) and may cover the upper side thereof. The third horizontal part 143H may intersect the third vertical part 143V, and may extend along the third seating part 150R3. A third rib 143R may protrude from a front surface of the third horizontal part 143H and may extend along the third seating part 150R3. A third protrusion 143Sa of a third fixing part 143S may protrude from the front surface of the third horizontal part 143H, may be disposed between the third rib 143R and the third seating part 150R3, and may extend along the third seating part 150R3. A third overlapping portion 143Sb of the third fixing part 143S may be bent downward at a front end of the third protrusion 143Sa and may be seated on a front surface of the third seating part 150R3. With respect to the third horizontal part 143H, a height of the third overlapping portion 143Sb may be substantially equal to a height of the third rib 143R. A third through hole 140h3 may be formed through front and rear sides of the third overlapping portion 143Sb and may be aligned with the third hole 150h3. Each of a plurality of third through holes 140h3 may be aligned with each of the plurality of third holes 150h3.

The fourth part 144 may include a fourth vertical part 142V and a fourth horizontal part. The fourth vertical part 144V may extend along the lower side of the plate 130 (see FIG. 12) and may cover the lower side thereof. The fourth horizontal part 144H may intersect the fourth vertical part 144V and may extend along the fourth seating part 150R4. A fourth rib may protrude from a front surface of the fourth horizontal part and may extend along the fourth seating part 150R4. A fourth protrusion of a fourth fixing part may protrude from the front surface of the fourth horizontal part, may be disposed between the fourth rib and the fourth seating part 150R4, and may extend along the fourth seating part 150R4. A fourth overlapping portion of the fourth fixing part may be bent upward at a front end of the fourth protrusion and may be seated on the front surface of the fourth seating part 150R4. With respect to the fourth horizontal part, a height of the fourth overlapping portion may be substantially equal to a height of the fourth rib. A fourth through hole may be formed through front and rear sides of the fourth overlapping portion and may be aligned with the fourth hole. Each of a plurality of fourth through holes may be aligned with each of the plurality of fourth holes. For example, the fourth part 144 may be vertically symmetrical to the third part 143.

Accordingly, the side frame 140 may be seated on the seating parts 150R1, 150R2, 150R3, and 150R4 of the frame 150.

Figure 12:
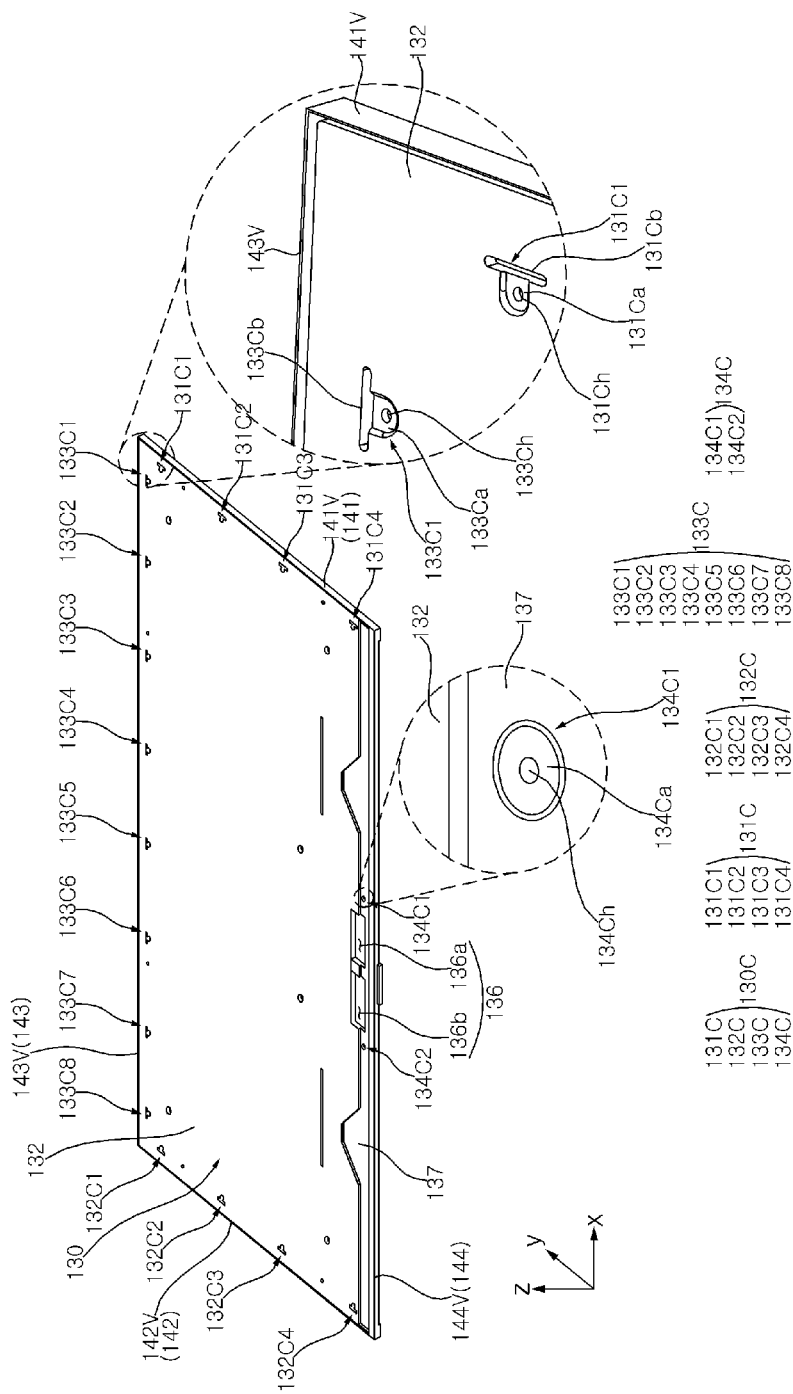

Referring to FIGS. 11 and 12, the plate 130 may be opposite to the frame 150 with respect to the overlapping portions 141Sa and 143Sb of the side frame 140 and may cover the horizontal parts 141H and 143H of the side frame 140 and the frame 150. The rear surface of the plate 130 may be supported by the first overlapping portion 141Sa, the second overlapping portion, the third overlapping portion 143Sb, and the fourth overlapping portion. In addition, the rear surface of the plate 130 may be supported by the first rib 141R, the second rib, the third rib 143R, and the fourth rib.

Figure 13:
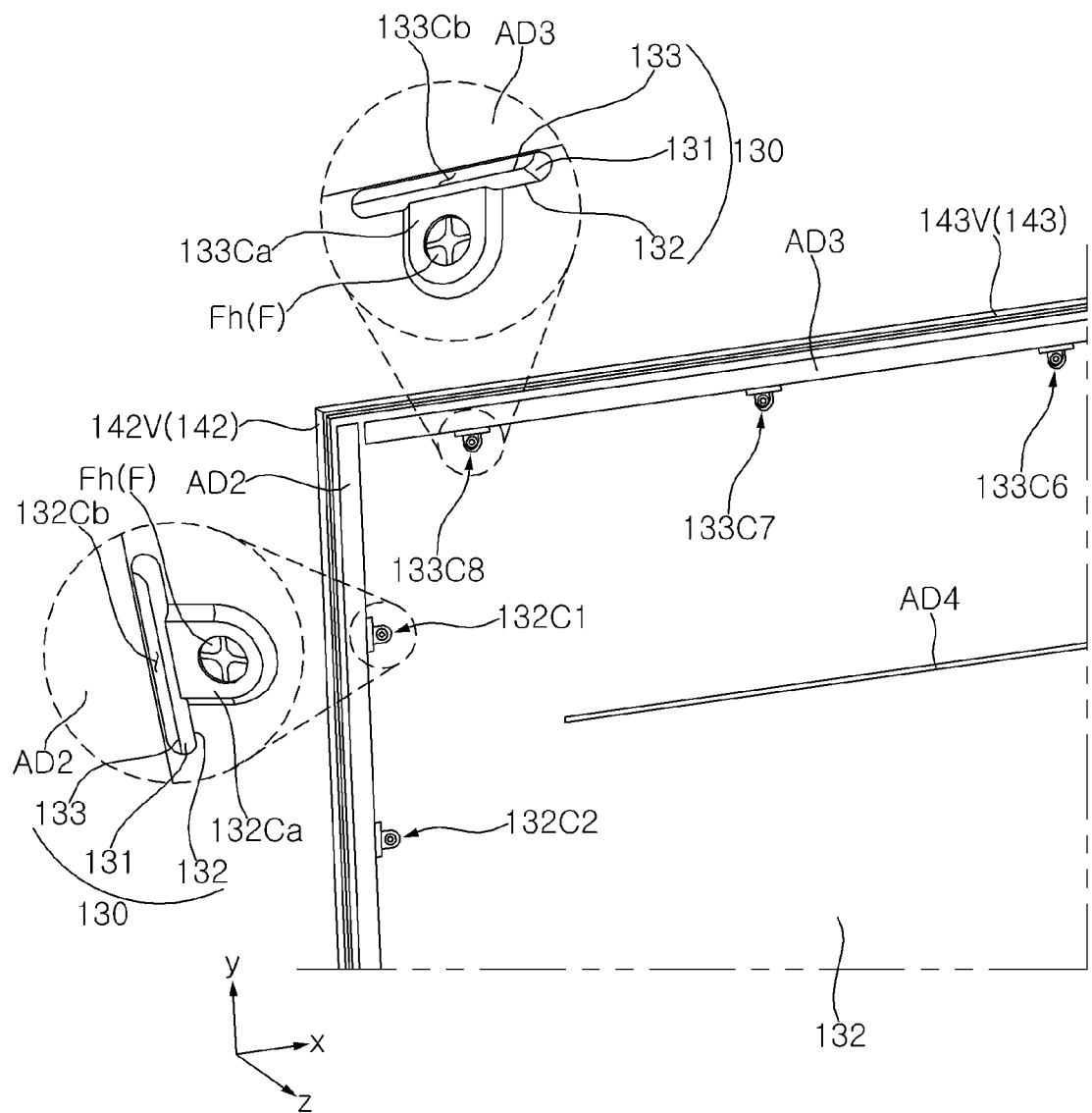

Referring to FIGS. 12 and 13, a plurality of coupling parts 130C may be formed on the plate 130 and may be arranged along the edges of the plate 130. The plurality of coupling parts 130C may be adjacent to an inner boundary of the first to third adhesive members AD1, AD2, and AD3.

A first coupling part 131C may be adjacent to the left side of the plate 130. A plurality of first coupling parts 131C1, 131C2, 131C3, and 131C4 may be vertically spaced apart from each other. A first coupling hole 131Ch of the first coupling part 131C may be formed through front and rear sides of the plate 130 and may be aligned with the first through hole 140h1 (see FIG. 11). A first recess 131Ca may be recessed rearwardly from the front surface of the front skin 132, and the first coupling hole 131Ch may be formed in the first recess 131Ca. A first slit 131Cb may be formed through front and rear sides of the plate 130 and may be formed next to the first recess 131Ca. The first slit 131Cb may be connected to the first recess 131Ca at a position between the first recess 131Ca and the left side of the plate 130. A length of the first slit 131Cb may be greater than a width of the first recess 131Ca. If the plate 130 includes a layer having a restoring force, such as the core 131 (see FIG. 3) of a fiber material or the core 131' (see FIG. 6) having a corrugated shape, it is desirable in terms of formability that the first slit 131Cb is made before the first recess 131Ca is formed in the plate 130.

Accordingly, a fastening member F, such as a screw, may pass through the first coupling hole 131Ch and the first through hole 140h1 (see FIG. 11) to be screwed into the first hole 150h1 (see FIG. 10). A head Fh of the fastening member F may be seated on the first recess 131Ca.

A second coupling part 132C may be adjacent to the right side of the plate 130. A plurality of second coupling parts 132C1, 132C2, 132C3, and 132C4 may be vertically spaced apart from each other. A second coupling hole 132Ch of the second coupling part 132C may be formed through front and rear sides of the plate 130 and may be aligned with the second through hole (see FIG. 11). A second recess 132Ca may be recessed rearwardly from the front surface of the front skin 132, and the second coupling hole 132Ch may be formed in the second recess 132Ca. A second slit 132Cb may be formed through front and rear sides of the plate 130 and may be formed next to the second recess 132Ca. The second slit 132Cb may be connected to the second recess 132Ca at a position between the second recess 132Ca and the right side of the plate 130. A length of the second slit 132Cb may be greater than a width of the second recess 132Ca. If the plate 130 includes a layer having a restoring force, such as the core 131 (see FIG. 3) of a fiber material or the core 131' (see FIG. 6) having a corrugated shape, it is desirable in terms of formability that the second slit 132Cb is made before the second recess 132Ca is formed in the plate 130.

Accordingly, a fastening member F, such as a screw, may pass through the second coupling hole 132Ch and the second through hole (see FIG. 11) to be screwed into the second hole (see FIG. 10). The head Fh of the fastening member F may be seated on the second recess 132Ca.

A third coupling part 133C may be adjacent to the upper side of the plate 130. A plurality of third coupling parts 133C1, 133C2, 133C3, 133C4, 133C5, 133C6, 133C7, and 133C8 may be horizontally spaced apart from each other. A third coupling hole 133Ch of the third coupling part 133C may be formed through front and rear sides of the plate 130 and may be aligned with the third through hole 140h3 (see FIG. 11). A third recess 133Ca may be recessed rearwardly from the front surface of the front skin 132, and the third coupling hole 133Ch may be formed in the third recess 133Ca. A third slit 133Cb may be formed through front and rear sides of the plate 130 and may be formed next to the third recess 133Ca. The third slit 133Cb may be connected to the third recess 133Ca at a position between the third recess 133Ca and the upper side of the plate 130. A length of the third slit 133Cb may be greater than a width of the third recess 133Ca. If the plate 130 includes a layer having a restoring force, such as the core 131 (see FIG. 3) of a fiber material or the core 131' (see FIG. 6) having a corrugated shape, it is desirable in terms of formability that the third slit 133Cb is made before the third recess 133Ca is formed in the plate 130.

Accordingly, a fastening member F, such as a screw, may pass through the third coupling hole 133Ch and the third through hole 140*h*3 (see FIG. 11) to be screwed into the third hole 150*h*3 (see FIG. 10). The head Fh of the fastening member F may be seated on the third recess 133Ca.

A fourth coupling part 134C may be adjacent to the lower side of the plate 130. A plurality of fourth coupling parts 134C1 and 134C2 may be horizontally spaced apart from each other. A fourth coupling hole 134Ch of the fourth coupling part 134C may be formed through front and rear sides of the plate 130 and may be aligned with the fourth through hole (see FIG. 11). A fourth recess 134Ca may be recessed rearwardly from the front surface of the front skin 132, and the fourth coupling hole 134Ch may be formed in the fourth recess 134Ca. The fourth recess 134Ca may be formed in the receiving part 137 pressed rearwardly from the front skin 132. In this case, even when the plate 130 includes a layer having a restoring force, the fourth recess 134Ca may be formed easily without a fourth slit such as the first to third slits 131Cb, 132Cb, and 133Cb. Alternatively, the fourth slit may be formed next to the fourth recess 134Ca.

Accordingly, a fastening member F, such as a screw, may pass through the fourth coupling hole 134Ch and the fourth through hole (see FIG. 11) to be screwed into the fourth hole (see FIG. 10). The head Fh of the fastening member F may be seated on the fourth recess 134Ca.

Figure 14:
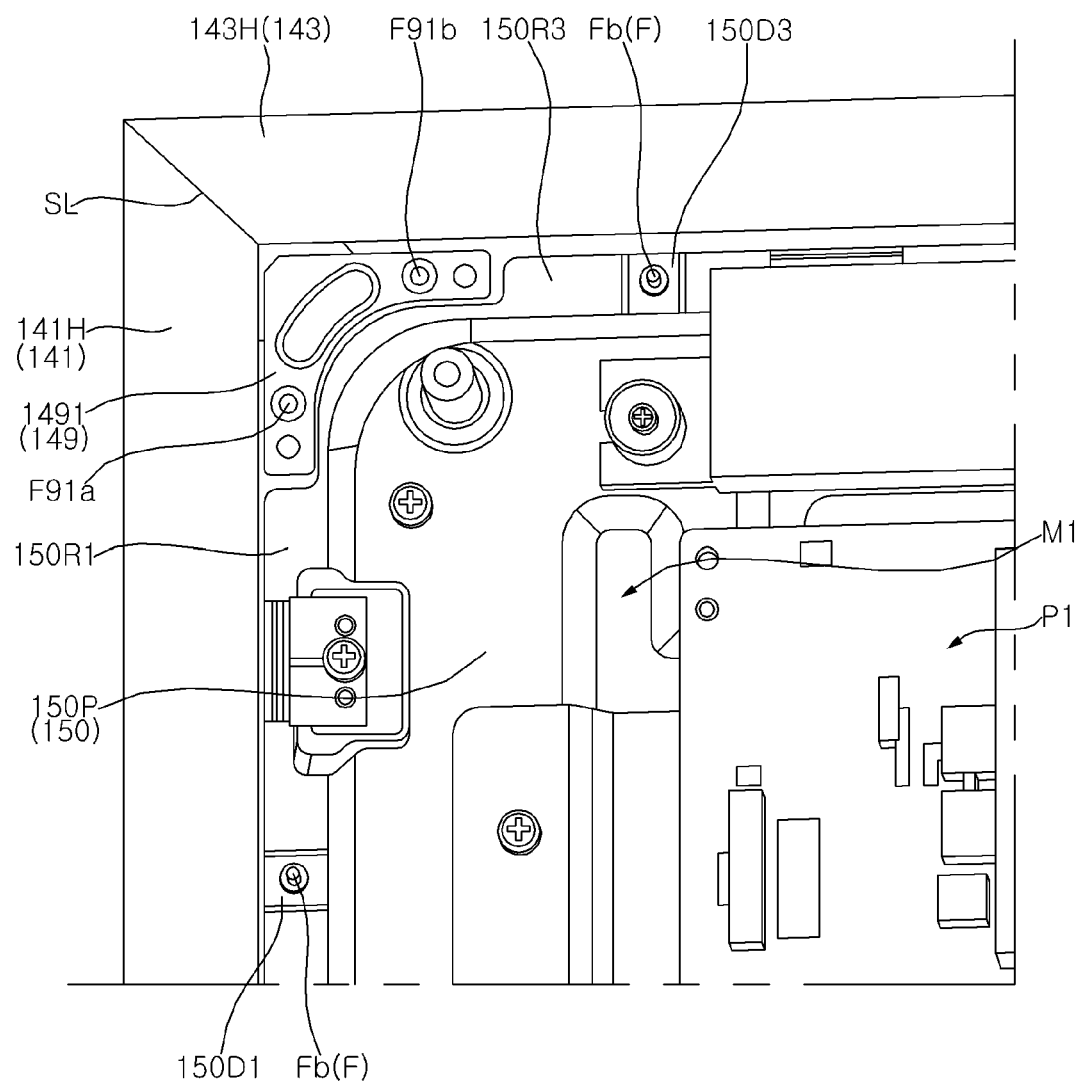

Referring to FIG. 14 along with FIGS. 10 and 11, a first corner brace 1491 may be positioned in the first cut-out 150C1 and may be disposed at the rear of the first overlapping portion 141Sb and the third overlapping portion 143Sb. A first protrusion 1491*a* of the first corner brace 1491 may pass through the first overlapping portion 141Sb, and a second protrusion 1491*b* of the first corner brace 1491 may pass through the third overlapping portion 143Sb. A first fastening member F91*a*, such as a screw, may be adjacent to the first protrusion 1491*a* and may pass through the first overlapping portion 141Sb to be screwed into the first corner brace 1491. A second fastening member F91*b*, such as a screw, may be adjacent to the second protrusion 1491*b* and may pass through the third overlapping portion 143Sb to be screwed into the first corner brace 1491.

Accordingly, the first corner brace 1491 may connect the first overlapping portion 141Sb and the third overlapping portion 143Sb. A second corner brace positioned in the second cut-out 150C2 may be vertically symmetrical to the first corner brace 1491 and may connect the first overlapping portion 141Sb and the fourth overlapping portion (see FIG. 11). A third corner brace positioned in the third cut-out 150C3 may be horizontally symmetrical to the second corner brace and may connect the second overlapping portion (see FIG. 11) and the fourth overlapping portion (see FIG. 11). A fourth corner brace positioned in the fourth cut-out 150C4 may be horizontally symmetrical to the first corner brace 1491 and may connect the third overlapping portion 143Sb and the second overlapping portion (see FIG. 11).

Figure 15:
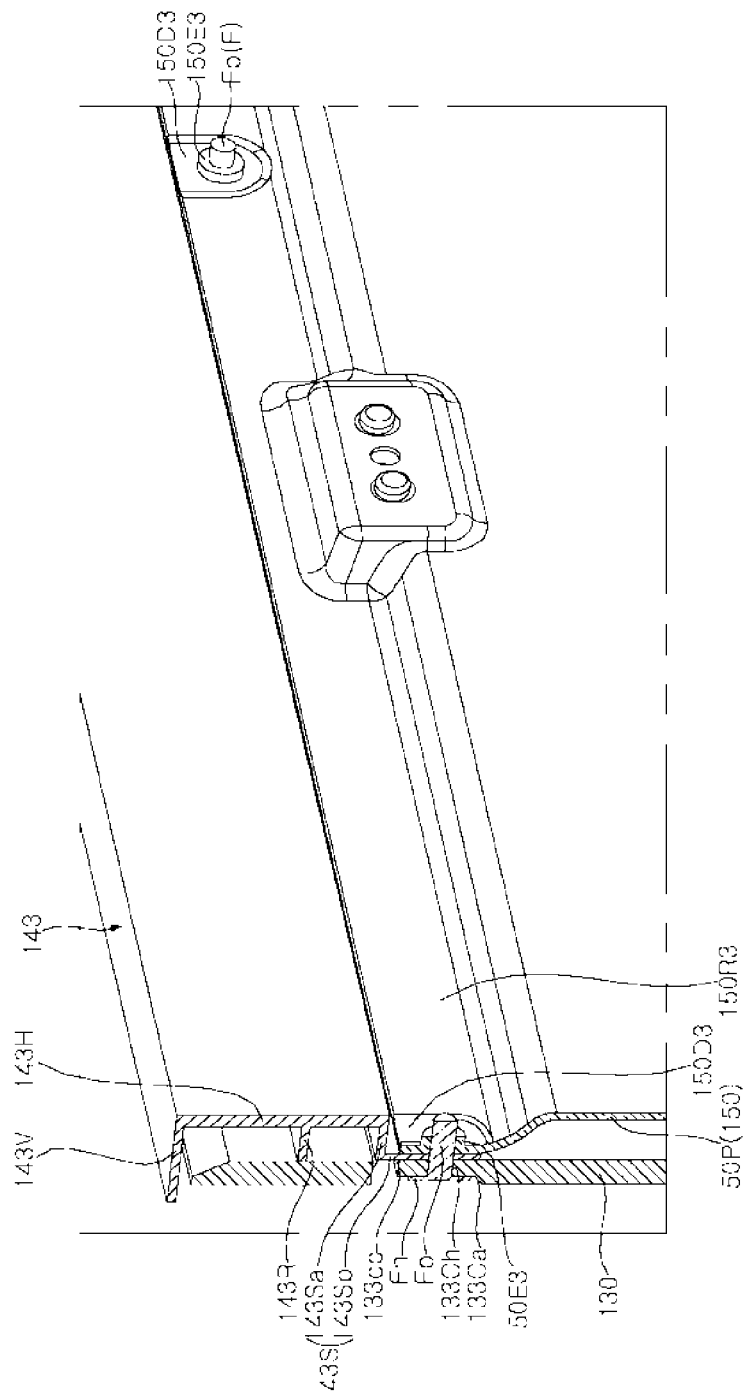
Figure 16:
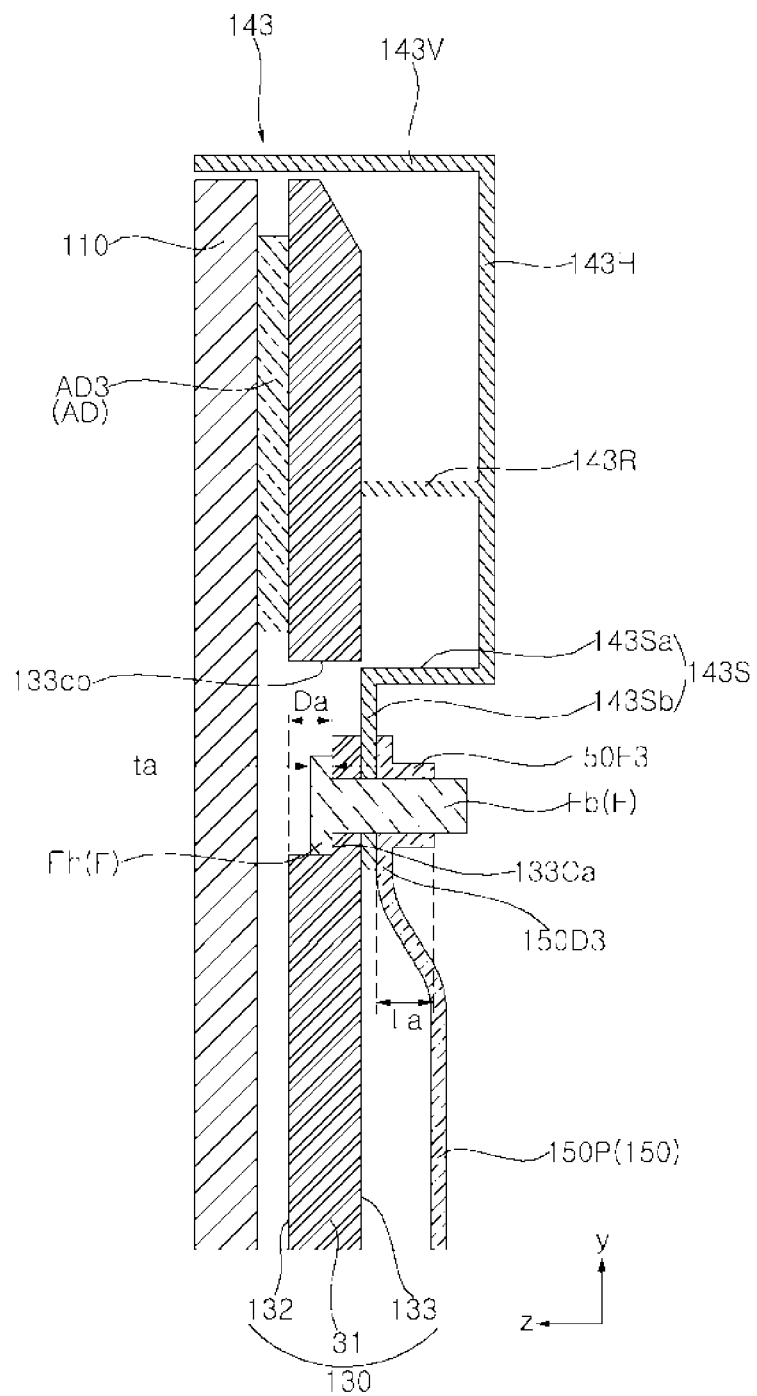

Referring to FIGS. 15 and 16, a body Fb of the fastening member F may pass through the plate 130, the third fixing part 143S of the third part 143, and the third seating part 150R3 of the frame 150. The third overlapping portion 143Sb of the third fixing part 143S may be sandwiched between the plate 130 and the third seating part 150R3.

For example, a fastening part 150E3 may protrude rearwardly from the third seating part 150R3. A female thread may be formed on an inner circumferential surface of the fastening part 150E3. Here, the fastening part 150E3 may be formed as one body with the third seating part 150R3. The body Fb may be inserted into the fastening part 150E3, and a male thread formed on an outer circumferential surface of the body Fb may be screwed into the female thread of the fastening part 150E3.

In another example, the fastening part 150E3 may be a PEM nut, and the third seating part 150R3 may be press-fit into the third seating part 150R3. The body Fb may be inserted into the fastening part 150E3, and the male thread formed on an outer circumferential surface of the body Fb may be screwed into the female thread formed on the inner circumferential surface of the fastening part 150E3.

In yet another example, the entire or a portion of the third seating part 150R3, through which the body Fb passes, may be formed thick corresponding to a fastening length of the body Fb. The body Fb may pass through the third seating part 150R3 of a predetermined thickness (see La of FIG. 16), and the male thread formed on the outer circumferential surface of the body Fb may be screwed into a female thread formed at a boundary of a hole of the third seating part 150R3.

The aforementioned fastening part 150E3 may be formed on the third pressed portion 150D3 which is pressed forwardly from the rear surface of the third seating part 150R3. The third pressed portion 150D3 may improve rigidity of a portion of the third seating part 150R3 at which the fastening part 150E3 is formed.

The head Fh of the fastening member F may be engaged with the front surface of the plate 130. A front end of the head Fh may be spaced rearwardly from the rear surface of the display panel 110. The head Fh may be seated on a front surface of the third seating part 133Ca. In the front-rear direction, a thickness ta of the head Fh may be equal to or smaller than a depth of the third seating part 133Ca. Alternatively, in the front-rear direction, the thickness ta of the head Fh may be greater than the depth of the third seating part 133Ca, but the front end of the head Fh may be spaced rearwardly from the rear surface of the display panel 110.

Accordingly, the plate 130, the third part 143, and the third seating part 150R3 may be coupled to each other by the fastening member F. Likewise, the plate 130, the fourth part 144, and the fourth seating part 150R4 (see FIG. 10) may be coupled to each other by the fastening member F (see FIG. 12). Likewise, the plate 130, the first part 141, and the first seating part 150R1 (see FIG. 10) may be coupled to each other by the fastening member F (see FIG. 12). Likewise, the plate 130, the second part 142, and the second seating part 150R2 (see FIG. 10) may be coupled to each other by the fastening member F (see FIG. 13).

As described above, the plate 130 may be coupled to the side frame 140 and the frame 150 by the fastening member F that passes through the plate 130 and the side frame 140 to be fastened to the frame 150, and the coupling may be referred to as triple coupling. In this case, convenience in coupling the plate 130, the side frame 140, and the frame 150 may be improved.

Alternatively, the plate 130 may be coupled to the frame 150 by the fastening member F that passes through the plate 130 to be fastened to the frame 150, in which case the side frame 140 may be coupled to the plate 130 and/or the frame 150 by a separate fastening member (means), without the fastening member F passing through the side frame 140. For example, the side frame 140 may not be sandwiched between the plate 130 and the frame 150, and the side frame 140 may be coupled to the plate 130 by a fastening member (not shown), such as a screw, that passes through the plate 130 and is fastened to the side frame 140. In another example, the side frame 140 may be directly coupled to the frame 150, so as to be indirectly coupled to the plate 130. The side frame 140 and the frame 150 may be collectively referred to as bases 140 and 150.

Further, the thickness ta of the head Fh may be smaller than the fastening length La of the body Fb and the fastening part 150E3. That is, as described above, contrary to the case in which the fastening member F is fastened to the plate 130 from the front to the rear thereof (i.e., the case in which the head Fh is engaged with the front surface of the plate 130, and the body Fb passes through the plate 130 and the side frame 140 to be fastened to the frame 150), if the fastening member F is fastened to the frame 150 from the rear to the front thereof (i.e., the case in which the head Fh is engaged with the rear surface of the frame 150, and the body Fb passes through the side frame 140 to be fastened to the plate 130), there is a concern that the fastening member F may be brought into contact with the rear surface of the display panel 110. In addition, if the third seating part 133Ca increases in depth in order to prevent such risk, a gap between the display panel 110 and the plate 130 may relatively increase in a region of the third seating part 133Ca, and air pocket may be formed in the gap in which hot air stays. The air pocket may cause a local hot-spot in the display panel 110. Accordingly, as described above, by fastening the fastening member F to the plate 130 from the front to the rear thereof, the local hot-spot formation may be minimized.

Figure 17:
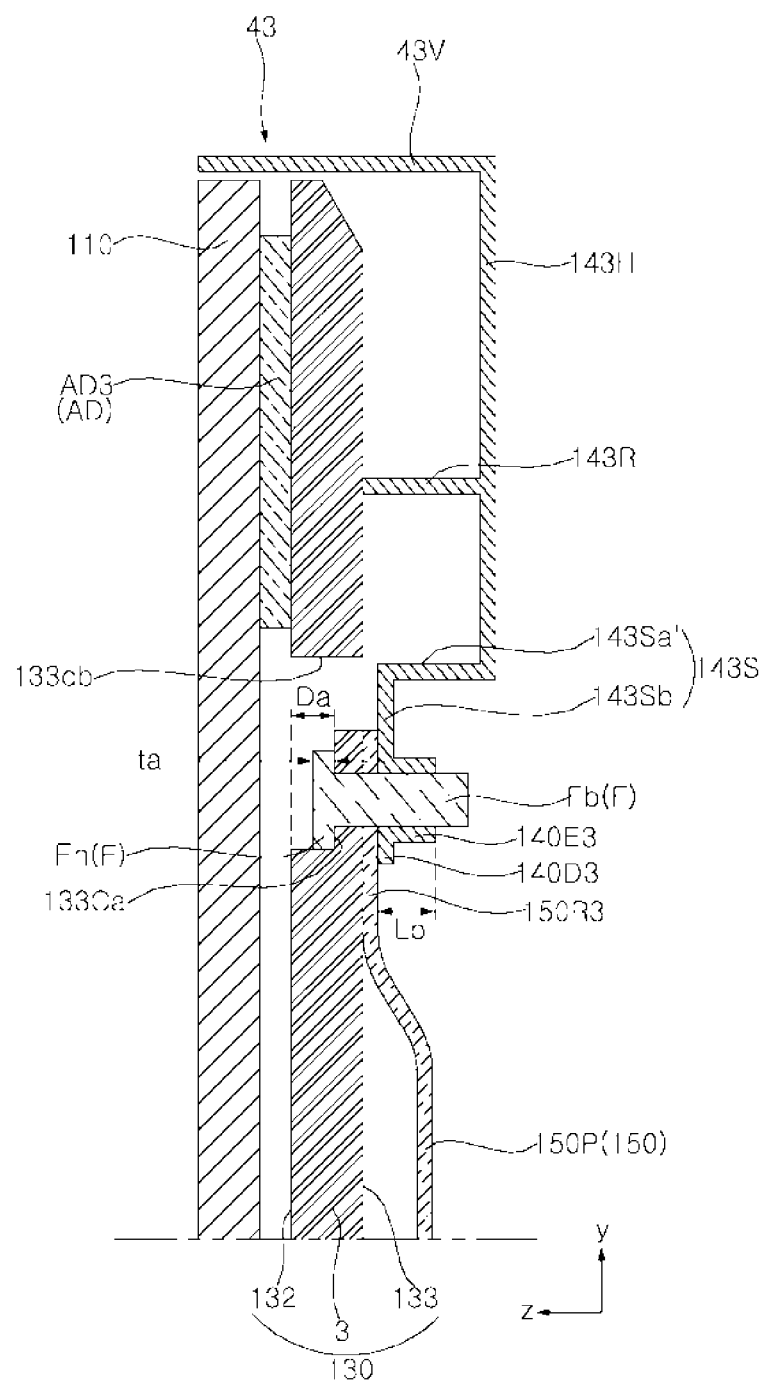

Referring to FIG. 17, the body Fb of the fastening member F may pass through the plate 130, the third seating part 150R3 of the frame 150, and a third fixing part 143S' of the third part 143. That is, unlike the example described above with reference to FIG. 16 and the like in which the third overlapping portion 143Sb of the third fixing part 143S is sandwiched between the plate 130 and the third seating part 150R3, the third seating part 150R3 may be sandwiched between the plate 130 and a third overlapping portion 143Sb' of the third fixing part 143S. In this case, in the front-rear direction, a height of a third protrusion 143Sa' connected to the third overlapping portion 143Sb' may be smaller than a height of the third rib 143R by a thickness of the third seating part 150R3.

For example, a fastening part 140E3 may protrude rearwardly from the third overlapping portion 143Sb', and a female thread may be formed on an inner circumferential surface of the fastening part 140E3. Here, the fastening part 140E3 may be formed as one body with the third overlapping portion 143Sb'. The body Fb may be inserted into the fastening part 140E3, and the male thread formed on the outer circumferential surface of the body Fb may be screwed into the female thread of the fastening part 140E3.

In another example, the fastening part 140E3 may be a PEM nut and may be press-fit into the third overlapping portion 143Sb'. The body Fb may be inserted into the fastening part 140E3, and the male thread formed on the outer circumferential surface of the body Fb may be screwed into the female thread formed on the inner circumferential surface of the fastening part 140E3.

In yet another example, the entire or a portion of the third overlapping portion 143Sb', through which the body Fb passes, may be formed thick corresponding to a fastening length of the body Fb. The body Fb may pass through the third overlapping portion 143Sb' of a predetermined thickness Lb (see FIG. 17), and the male thread formed on the outer circumferential surface of the body Fb may be screwed into a female thread formed at a boundary of a hole of the third overlapping portion 143Sb'.

The aforementioned fastening part 140E3 may be formed on a third pressed portion 140D3 which is pressed forwardly from a rear surface of the third overlapping portion 143Sb'. The third pressed portion 140D3 may improve rigidity of a portion of the third overlapping portion 143Sb' at which the fastening part 140E3 is formed.

The head Fh of the fastening member F may be engaged with the front surface of the plate 130. The head Fh may be seated on the front surface of the third seating part 133Ca. In the front-rear direction, the thickness ta of the head Fh may be equal to or smaller than the depth of the third seating part 133Ca. Alternatively, in the front-rear direction, the thickness ta of the head Fh may be greater than the depth of the third seating part 133Ca, and the front end of the head Fh may be spaced rearwardly from the rear surface of the display panel 110.

Accordingly, the plate 130, the third seating part 150R3, and the third part 143 may be coupled to each other by the fastening member F. Likewise, the plate 130, the fourth seating part 150R4 (see FIG. 10), and the fourth part 144 may be coupled to each other by the fastening member F (see FIG. 12). Likewise, the plate 130, the first seating part 150R1 (see FIG. 10), and the first part 141 may be coupled to each other by the fastening member F (see FIG. 12). Likewise, the plate 130, the second seating part 150R2 (see FIG. 10), and the second part 142 may be coupled to each other by the fastening member F (see FIG. 13).

As described above, the plate 130 may be coupled to the frame 150 and the side frame 140 by the fastening member F that passes through the plate 130 and the frame 150 to be fastened to the side frame 140, and the coupling may be referred to as triple coupling. In this case, convenience in coupling the plate 130, the frame 150, and the side frame 140 may be improved.

Alternatively, the plate 130 may be coupled to the side frame 140 by the fastening member F that passes through the plate 130 to be fastened to the side frame 140, in which case the frame 150 may be coupled to the plate 130 and/or the side frame 140 by a separate fastening member (means), without the fastening member F passing through the frame 150. For example, the frame 150 may not be sandwiched between the plate 130 and the side frame 140, and the frame 150 may be coupled to the plate 130 by a fastening member (not shown), such as a screw, that passes through the plate 130 and is fastened to the frame 150. In another example, the frame 150 may be directly coupled to the side frame 140, so as to be indirectly coupled to the plate 130. The frame 150 and the side frame 140 may be referred to as bases 140 and 150.

Further, the thickness ta of the head Fh may be smaller than the fastening length La of the body Fb and the fastening part 140E3. That is, as described above, contrary to the case in which the fastening member F is fastened to the plate 130 from the front to the rear thereof (i.e., the case where the head Fh is engaged with the front surface of the plate 130, and the body Fb passes through the plate 130 and the frame 150 to be fastened to the side frame 140), if the fastening member F is fastened to the side frame 140 from the rear to the front thereof (i.e., the case where the head Fh is engaged with the rear surface of the side frame 140, and the body Fb passes through the side frame 140 and the frame 150 to be fastened to the plate 130), there is a concern that the fastening member F may be brought into contact with the rear surface of the display panel 110. In addition, if the third seating part 133Ca increases in depth in order to prevent such risk, a gap between the display panel 110 and the plate 130 may relatively increase in a region of the third seating part 133Ca, and air pocket may be formed in the gap in which hot air stays. The air pocket may cause a local hot-spot in the display panel 110. Accordingly, as described above, by fastening the fastening member F to the plate 130 from the front to the rear thereof, the local hot-spot formation may be minimized.

Referring to FIGS. 1 to 17, a display device according to an embodiment of the present disclosure may include: a display panel; a plate which is disposed at a rear of the display panel and to which the display panel is coupled; a base disposed at a rear of the plate; and a fastening member for coupling the plate to the base, wherein the fastening member may include: a head contacting a front surface of the plate; and a body protruding from the head and passing through the plate to be fastened to the base.

The display device may further include an adhesive member coupled to a rear surface of the display panel and a front surface of the plate, wherein a front end of the head may be spaced rearwardly from the rear surface of the display panel.

The plate may include a recess that is recessed rearwardly from the front surface of the plate, wherein the head may be seated on a front surface of the recess.

A thickness of the head may be smaller than a fastening length of the body and the base in a front-rear direction.

The plate may further include: a layer having a restoring force; and a slit formed through the layer and positioned next to the recess.

The base may include: a frame disposed at the rear of the plate; and a side frame extending along an edge of the plate.

A portion of the side frame may be disposed between the plate and the frame and may be seated on the frame, wherein the body may pass through the plate and the portion of the side frame to be fastened to the frame.

The frame may further include a fastening part which protrudes rearwardly from a rear surface of the frame and into which the body is inserted, wherein an outer circumferential surface of the body may be screwed to an inner circumferential surface of the fastening part.

The frame may further include a pressed portion which is pressed forwardly from the rear surface of the frame, through which the body passes, and at which the fastening part is formed.

The portion of the frame may be disposed between the plate and the side frame and may be seated on the side frame, wherein the body may pass through the plate and the portion of the frame to be fastened to the side frame.

The body may pass through the plate to be fastened to the frame or the side frame.

The side frame may include: a vertical part covering the edge of the plate; a horizontal part intersecting the vertical part and facing a rear surface of the plate; a protrusion protruding from the horizontal part toward the plate; and an overlapping portion which is bent from the protrusion and through which the body passes.

The side frame may include: a first part extending along a left side of the frame; a second part extending along a right side of the frame; a third part extending along an upper side of the frame; and a fourth part extending along a lower side of the frame, wherein the plate may be disposed inside the side frame and may cover a front surface of the frame.

The frame may include: a flat plate part; a first seating part which protrudes from a left side of the flat plate part and on which the first part is seated; a second seating part which protrudes from a right side of the flat plate part and on which the second part is seated; a third seating part which protrudes from an upper side of the flat plate part and on which the third part is seated; and a fourth seating part which protrudes from a lower side of the flat plate part and on which the fourth part is seated.

The fastening member may include a plurality of fastening members arranged along edges of the plate.

The display device according to the present disclosure has the following effects.

According to at least one of the embodiments of the present disclosure, a structure for coupling a side frame and/or a frame to a plate may be provided.

According to at least one of the embodiments of the present disclosure, there may be provided a structure for coupling a plate, a side frame, and a frame by a fastening member such as a screw.

According to at least one of the embodiments of the present disclosure, there may be provided a structure for minimizing damage to a display panel or a local hot-spot occurring therein, which is caused by a coupling structure using a fastening member.

Certain embodiments or other embodiments of the invention described above are not mutually exclusive or distinct from each other. Any or all elements of the embodiments of the invention described above may be combined or combined with each other in configuration or function.

For example, a configuration "A" described in one embodiment of the invention and the drawings and a configuration "B" described in another embodiment of the invention and the drawings may be combined with each other. Namely, although the combination between the configurations is not directly described, the combination is possible except in the case where it is described that the combination is impossible.

The foregoing embodiments are merely examples and are not to be considered as limiting the present disclosure. The scope of the present disclosure should be determined by rational interpretation of the appended claims, and all modifications within the equivalents of the disclosure are intended to be included within the scope of the present disclosure.

What is claimed is:

1. A display device comprising:
    a display panel;
    a plate which is disposed at a rear of the display panel and to which the display panel is coupled and having a coupling hole penetrating the plate in a front-rear direction;
    a base disposed at a rear of the plate and having a hole penetrating the base in the front-rear direction; and
    a fastening member coupling the plate to the base,
    wherein the fastening member comprises:
    a head disposed between the display panel and the plate and contacting the plate; and
    a body extending rearward from the head and passing through the coupling hole and the hole of the base.

2. The display device of claim 1, further comprising an adhesive member coupled to a rear surface of the display panel and a front surface of the plate, wherein a front end of the head is spaced rearwardly from the rear surface of the display panel.

3. The display device of claim 1, wherein the plate comprises a recess that is recessed rearwardly from a front surface of the plate,
wherein the head is seated on a front surface of the recess.

4. The display device of claim 3, wherein a thickness of the head is smaller than a fastening length of the body and the base in the front-rear direction.

5. The display device of claim 3, wherein the plate further comprises:
a layer having a restoring force; and
a slit formed through the layer and positioned next to the recess.

6. The display device of claim 1, wherein the base comprises:
a frame disposed at the rear of the plate; and
a side frame extending along an edge of the plate.

7. The display device of claim 6, wherein a portion of the side frame is disposed between the coupling hole, and a through hole of the frame and is seated on the frame,
wherein the body passes through the plate and the portion of the side frame to be fastened to the frame.

8. The display device of claim 7, wherein the frame further comprises a fastening part which protrudes rearwardly from a rear surface of the frame and into which the body is inserted,
wherein an outer circumferential surface of the body is screwed to an inner circumferential surface of the fastening part.

9. The display device of claim 8, wherein the frame further comprises a pressed portion which is pressed forwardly from the rear surface of the frame, through which the body passes, and at which the fastening part is formed.

10. The display device of claim 6, wherein a portion of the frame is disposed between the plate and the side frame and is seated on the side frame,
wherein the body passes through the coupling hole and the portion of the frame to be fastened to the side frame.

11. The display device of claim 6, wherein the body passes through the coupling hole to be fastened to the frame or the side frame.

12. The display device of claim 6, wherein the side frame comprises:
a vertical part covering the edge of the plate;
a horizontal part intersecting the vertical part and facing a rear surface of the plate;
a protrusion protruding from the horizontal part toward the plate; and
an overlapping portion which is bent from the protrusion and through which the body passes.

13. The display device of claim 6, wherein the side frame comprises:
a first part extending along a left side of the frame;
a second part extending along a right side of the frame;
a third part extending along an upper side of the frame; and
a fourth part extending along a lower side of the frame,
wherein the plate is disposed inside the side frame and covers a front surface of the frame.

14. The display device of claim 13, wherein the frame comprises:
a flat plate part;
a first seating part which protrudes from a left side of the flat plate part and on which the first part is seated;
a second seating part which protrudes from a right side of the flat plate part and on which the second part is seated;
a third seating part which protrudes from an upper side of the flat plate part and on which the third part is seated; and
a fourth seating part which protrudes from a lower side of the flat plate part and on which the fourth part is seated.

15. The display device of claim 1, wherein the fastening member comprises a plurality of fastening members arranged along edges of the plate.

* * * * *